(12) United States Patent  
Walker et al.

(10) Patent No.: US 9,344,284 B2  
(45) Date of Patent: *May 17, 2016

(54) METHOD OF ANONYMOUS ENTITY AUTHENTICATION USING GROUP-BASED ANONYMOUS SIGNATURES

(71) Applicant: Intel Corporation, Santa Clara, CA (US)

(72) Inventors: Jesse Walker, Hillsboro, OR (US); Jiangtao Li, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 225 days.

This patent is subject to a terminal disclaimer.

(21) Appl. No.: 14/077,772

(22) Filed: Nov. 12, 2013

(65) Prior Publication Data

US 2014/0082362 A1  Mar. 20, 2014

Related U.S. Application Data

(62) Division of application No. 13/100,017, filed on May 3, 2011, now Pat. No. 8,707,046.

(51) Int. Cl.
*H04L 29/06* (2006.01)
*H04L 9/32* (2006.01)
*H04L 9/08* (2006.01)

(52) U.S. Cl.
CPC ............ *H04L 9/3273* (2013.01); *H04L 9/0838* (2013.01); *H04L 9/0844* (2013.01); *H04L 9/3247* (2013.01); *H04L 9/3255* (2013.01); *H04L 9/3268* (2013.01); *H04L 2209/42* (2013.01)

(58) Field of Classification Search
CPC .................................................... H04L 9/3273
See application file for complete search history.

(56) References Cited

U.S. PATENT DOCUMENTS

| 8,185,741 | B1* | 5/2012 | Agrawal | H04L 9/3247 713/176 |
| 2005/0216736 | A1* | 9/2005 | Smith | H04L 63/166 713/168 |
| 2008/0270786 | A1* | 10/2008 | Brickell | H04L 9/3073 713/155 |
| 2008/0270790 | A1* | 10/2008 | Brickell | G06F 21/57 713/158 |
| 2008/0307223 | A1* | 12/2008 | Brickell | H04L 63/126 713/158 |
| 2009/0019282 | A1* | 1/2009 | Arditti | H04L 9/32 713/168 |
| 2009/0041239 | A1* | 2/2009 | Teranishi | H04L 9/3218 380/46 |
| 2009/0129600 | A1* | 5/2009 | Brickell | H04L 9/3073 380/282 |

(Continued)

OTHER PUBLICATIONS

Rongxing et al.; A Novel Anonymous Mutual Authentication Protocol With Provable Link-Layer Location Privacy; Published in: Vehicular Technology, IEEE Transactions on (vol. 58, Issue: 3 ); Date of Publication:May 14, 2008; pp. 1454-1466; IEEE Xplore.*

(Continued)

*Primary Examiner* — Bradley Holder
(74) *Attorney, Agent, or Firm* — Steven Skabrat (57) ABSTRACT

Methods for anonymous authentication and key exchange are presented. In one embodiment, a method includes initiating a two-way mutual authentication between a first entity and a second entity. The first entity remains anonymous to the second entity after performing the authentication. The method also includes establishing a mutually shared session key for use in secure communication between the entities, wherein the initiating and the establishing are in conjunction with direct anonymous attestation (DAA).

23 Claims, 6 Drawing Sheets

(56) References Cited

U.S. PATENT DOCUMENTS

| | | | |
|---|---|---|---|
| 2009/0210705 A1* | 8/2009 | Chen | H04L 9/0891 713/158 |
| 2009/0210716 A1* | 8/2009 | Chen | G06F 21/33 713/176 |
| 2010/0082973 A1* | 4/2010 | Brickell | H04L 9/3073 713/155 |
| 2010/0169650 A1* | 7/2010 | Brickell | H04L 9/3066 713/176 |
| 2011/0133883 A1* | 6/2011 | Pang | H04L 9/3273 340/5.8 |

OTHER PUBLICATIONS

Burmester et al.; Robust, anonymous RFID authentication with constant key-lookup; Published in: Proceeding ASIACCS '08 Proceedings of the 2008 ACM symposium on Information, computer and communications security; 2008; pp. 283-291; ACM Digital Library.*

* cited by examiner

METHOD OF ANONYMOUS ENTITY AUTHENTICATION USING GROUP-BASED ANONYMOUS SIGNATURES

CROSS REFERENCE TO RELATED APPLICATION

This application is a divisional of U.S. patent application Ser. No. 13/100,017 filed May 3, 2011, now published as U.S. patent publication No. 2012-0284518 on Nov. 8, 2012, by inventors Walker et al., assigned to Intel Corporation.

FIELD

The present disclosure generally relates to the field of cryptography. More particularly, an embodiment of the invention relates to direct anonymous attestation (DAA).

BACKGROUND

The objective of direct anonymous attestation (DAA) is to enable a party to prove that the party is a member in good standing in a group without revealing information about its identity. In the DAA scheme, there are three types of entities: an issuer, a prover, and verifiers.

An issuer is an entity that issues a unique DAA private key to each member of the group. A verifier is an entity which is trying to establish whether a platform is a member of the group. A prover platform is an entity which is trying to prove membership in the group. If the platform is indeed a member in the group in good standing (i.e., the platform owns a valid DAA private key and the private key has not been revoked), the authentication process will be successful.

For each DAA group, there is a group public key and a group issuing private key (master key). The group issuing private key is used for generating a unique private key for each group member. The issuing private key is kept securely by the issuer. Each platform uses its DAA private key to digitally sign a message. The resulting signature is referred to as a DAA signature. The verifier uses the group public key to verify the correctness of a DAA signature, i.e., to verify that the signature was indeed created by a platform with a valid DAA private key. The DAA signature however does not reveal any information about which unique private key was used to create the DAA signature. The DAA scheme includes methods to handle revocation, such as, for example, a private-key based revocation and a signature based revocation. The DAA scheme does not include generating mutual shared session keys.

The SIGMA (SIGn-and-MAc Approach) protocol is a Diffie-Hellman based key exchange protocol using digital signatures. The protocol is used by the Internet Key Exchange (IKE) standards (such as RFC 5996) and the Internet Protocol Security (IPsec) standards.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Methods for mutual anonymous authentication using group-based anonymous signatures are presented. In one embodiment, a method includes initiating a two-way mutual authentication between a first entity and a second entity. The first entity remains anonymous to the second entity after performing the authentication. The method also includes establishing a mutually shared session key for use in secure communication, wherein the initiating and the establishing are in conjunction with direct anonymous attestation (DAA). Embodiments of the present invention deter misbinding attacks.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the following description, certain terminology is used to describe certain features of one or more embodiments of the invention. For instance, "platform" is defined as any type of computing or communication device that is adapted to process, transmit and/or receive information. Examples of various platforms include, but are not limited or restricted to computer systems (including, but not limited to mobile, desktop, and tablet computers), personal digital assistants, cellular telephones (including smart phones), mobile Internet devices (MIDs), set-top boxes, facsimile machines, printers, modems, routers, smart cards or other like form factor device including an integrated circuit, or other like device such as a bank card, credit card, identification card and the like including logic to perform enhanced revocation according to any one of the described embodiments. A "communication link" is broadly defined as one or more information-carrying mediums adapted to a platform. Examples of various types of communication links include, but are not limited or restricted to electrical wire(s), optical fiber(s), cable(s), bus trace(s), or wireless signaling technology.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

In one embodiment, a "verifier" is an entity (e.g., person, platform, system, and/or device) that requests some verification of authenticity or authority from another entity. Normally, this is performed prior to disclosing or providing the requested information. A "prover" is an entity that is requested to provide some proof of its authority, validity, and/or identity. An "issuer" organizes or manages a trusted membership group and engages with hardware devices to join the trusted membership group. A "device manufacturer," which may be used interchangeably with "certifying manufacturer," is any entity that manufactures or configures a platform or a device (e.g., a Trusted Platform Module (TPM)). An issuer may be a device/certifying manufacturer.

Figure 1:
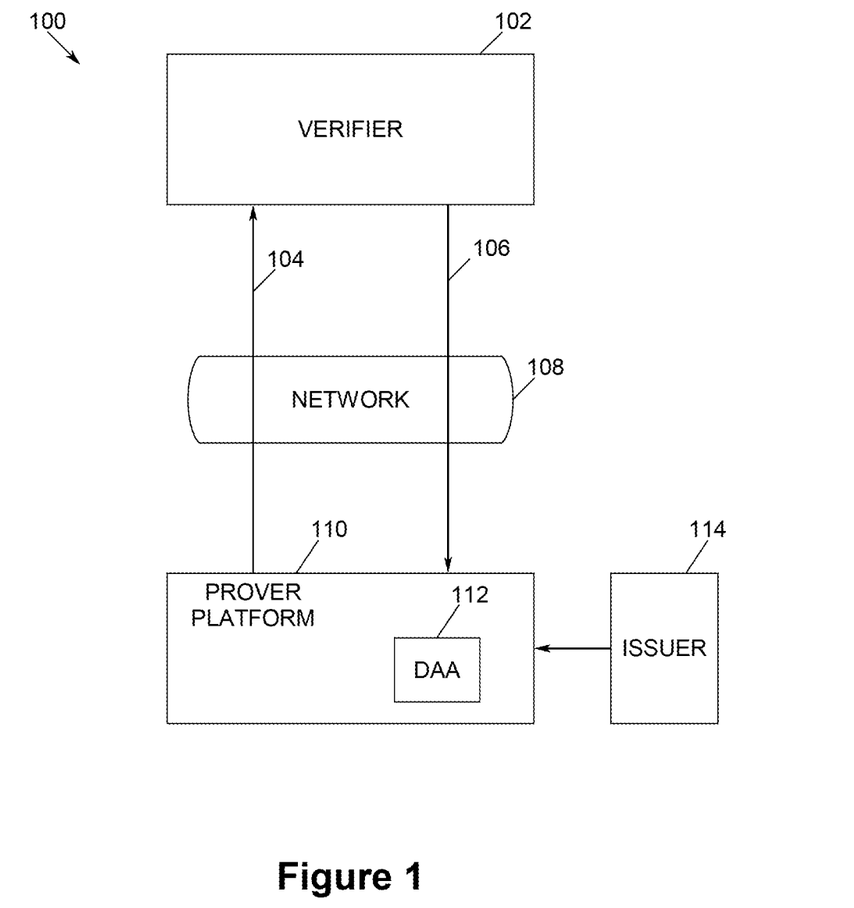
FIG. 1 is a system featuring a platform implemented with a DAA module in accordance with one embodiment of the invention.

FIG. 1 is a system featuring a platform implemented with a DAA module in accordance with one embodiment of the invention. Many related components such as buses and peripherals have not been shown to avoid obscuring the invention. Referring to FIG. 1, the system includes verifier 102, prover platform 110, DAA module 112, issuer 114, and network 108. In one embodiment, verifier 102 sends request 106 to prover platform 110 and receives authentication information 104 from prover platform 110.

In one embodiment, a trusted platform module (TPM) is a trusted hardware device (not shown in FIG. 1) within a prover platform. In one embodiment, DAA module 112 may be a part of the TPM. In another embodiment, DAA 112 is a module independent from the TPM. Verifier 102 (e.g., a first platform) transmits authentication request 106 to prover platform 110 (e.g., a second platform) via network 18. In response to request 106, prover platform 100 provides authentication information 104. In one embodiment, network 108 forms part of a local or wide area network, a conventional network infrastructure, or any combinations thereof, such as a company's Intranet, the Internet, or other like network.

In one embodiment, for heightened security, verifier 102 verifies whether prover platform 110 has been manufactured by a selected device manufacturer or a selected group of device manufacturers (hereinafter referred to as "device manufacturers"). In one embodiment, verifier 102 challenges prover platform 110 to show that prover platform 110 has cryptographic information (e.g., a private member key) generated by issuer 114. Prover platform 110 replies to the challenge by providing authentication information 104, in the form of a reply, to convince verifier platform 102 that prover platform 110 has cryptographic information generated by issuer 114, without revealing the cryptographic information or any unique, device/platform identification information also referred to herein as "unique, device identification information" to enable a trusted member device to remain anonymous to the verifier.

In one embodiment, the functionality of DAA module 112, which is configured to prove to verifier 102 that information (e.g., cryptographic key, digital signature, digital certificate, etc.) from DAA module 112 is uncompromised, may be deployed as firmware. However, it is contemplated that such functionality may be deployed as dedicated hardware, software, or the combination thereof. Instructions or code forming the firmware or software are stored on a machine-readable medium. As described herein, DAA is a scheme that enables remote authentication of DAA module 112, while preserving the privacy of the user of the platform that contains DAA module 112.

In one embodiment, prover platform 110 includes DAA module 112 to convince a verifier 102 that platform 110 possesses uncompromised cryptographic information without disclosure of the cryptographic information or any unique device identification information. In one embodiment, DAA module 112 includes a unique group membership certificate and a private member key to provide a private signature. In one embodiment, DAA module 112 in combination with prover platform 110 generates authentication information using a private unique signature key to prove to a verifier that prover platform 110 is a member of a trusted membership group defined by an issuer 114 (e.g., device manufacturer), without disclosure of any unique device identification information including the private signature key. This enables prover platform 110 to remain anonymous to a verifier.

In embodiments of the present invention, each entity in a mutual anonymous authentication scenario functions as both a verifier and a prover platform.

Figure 3:
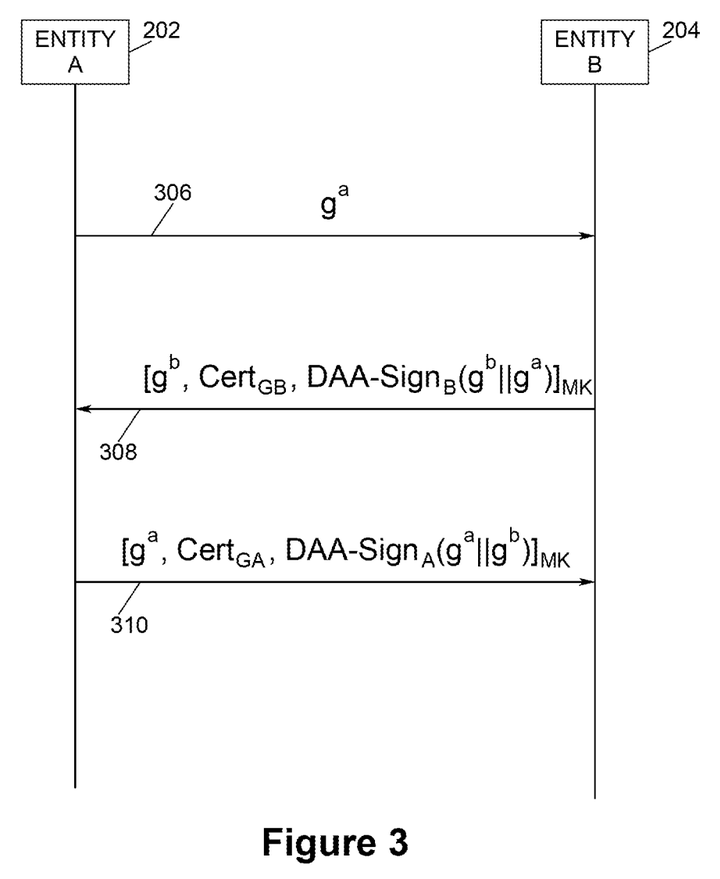
FIG. 3 shows a flow diagram of an embodiment of a process to perform mutual anonymous authentication using group based anonymous signatures.
Figure 4:
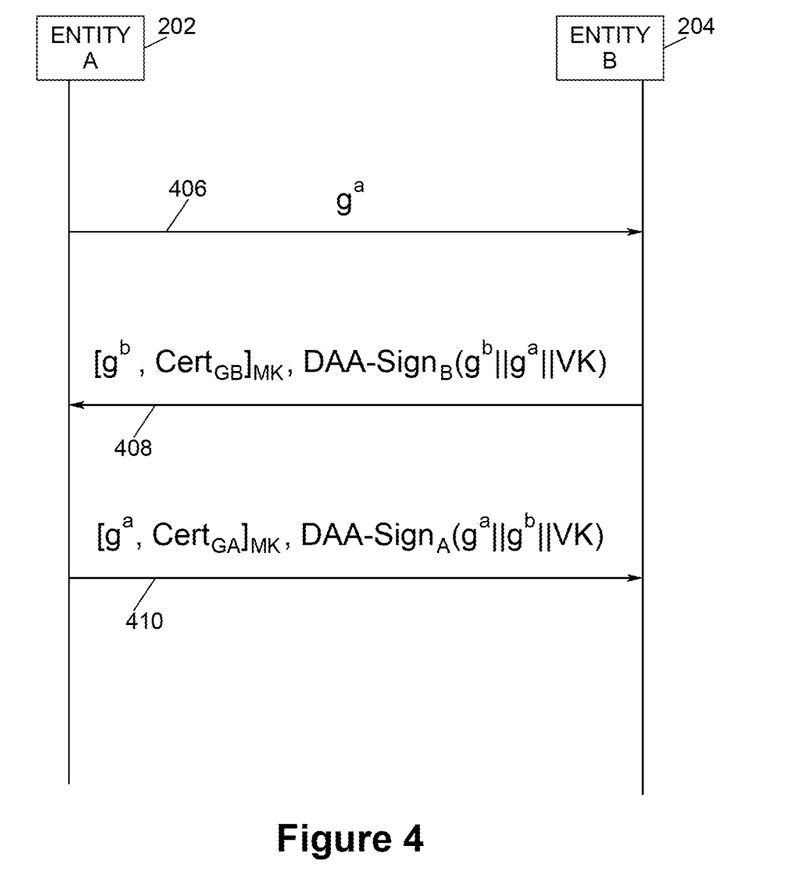
FIG. 4 shows a flow diagram of another embodiment of a process to perform mutual anonymous authentication using group based anonymous signatures.
Figure 5:
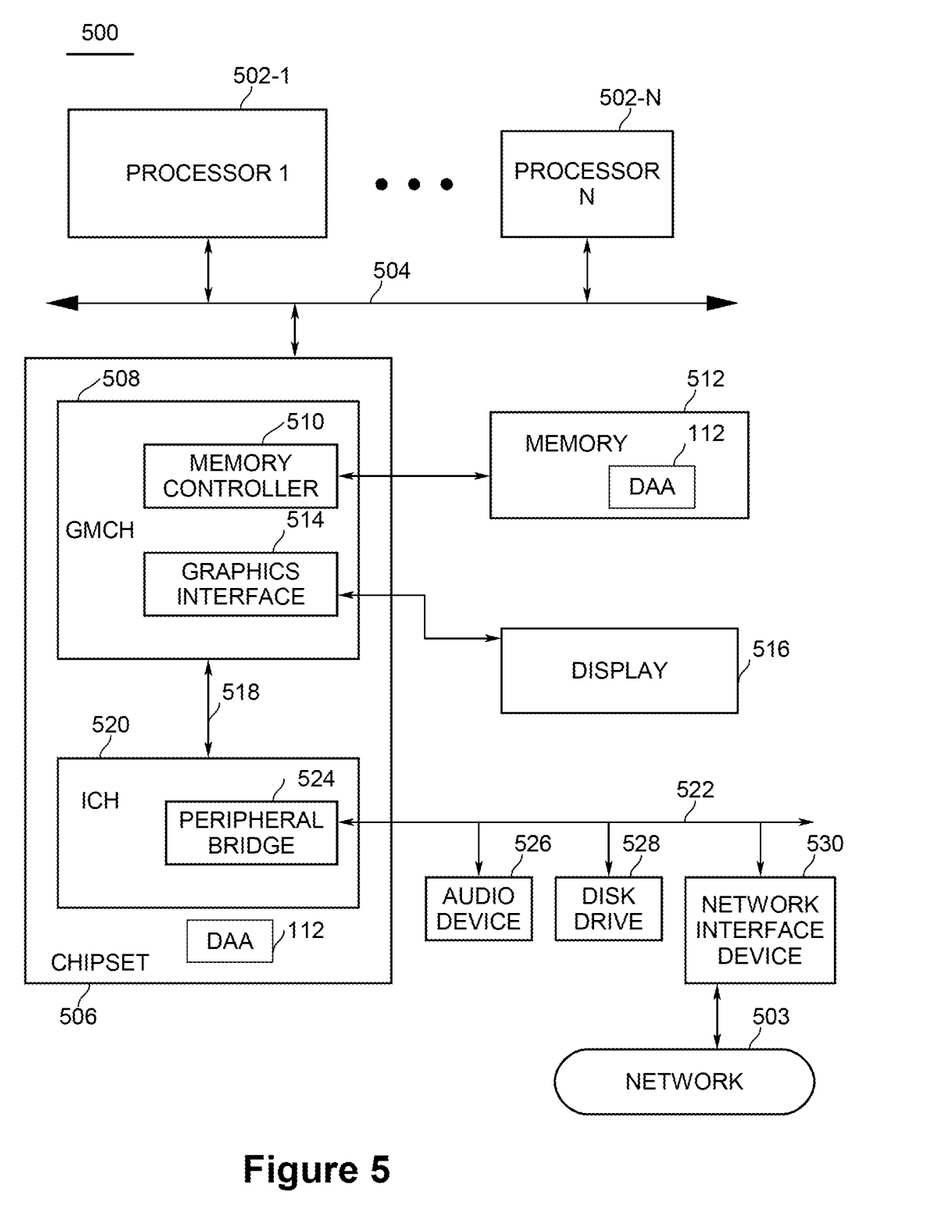
FIG. 5 illustrates a processing system for use with one embodiment of the present invention.

In one embodiment, the notations in Table 1 are used to describe FIGS. 3-5.

TABLE 1

MK denotes a Message Authentication Code (MAC) key.
$[M]_{MK}$: This denotes a message M concatenated with a MAC of message M. The MAC is computed using key MK.
$\{M\}_K$: This denotes the ciphertext of a message M encrypted by a symmetric key K.
$Cert_A$: This denotes a digital certificate certifying entity A's public key.
$Cert_B$: This denotes a digital certificate certifying entity B's public key.
$Cert_{GA}$: This denotes a digital certificate certifying entity A's group public key. This is known as a group public key certificate or group certificate.
$Sign_A(M)$: This denotes a digital signature of M computed using entity A's private key.
$DAA\text{-}Sign_A(M)$: This denotes a DAA signature of message M computed using entity A's DAA private key. The signature can be verified using the corresponding group public key.
a||b: denotes a string concatenation operation involving "a" and "b", or more generically a result by combining "a" and "b."

TABLE 1-continued $g^a$ denotes a key-exchange-protocol public key for entity A.
$g^b$ denotes a key-exchange-protocol public key for entity B.
$g^{ab}$ denotes a shared value generated from $g^a$ and $g^b$.
$PRF(g^{ab})$: denotes generating a shared value using a pseudo-random function in conjunction with $g^{ab}$.
SK denotes a session key.
VK denotes a secret binding key.

Figure 2:
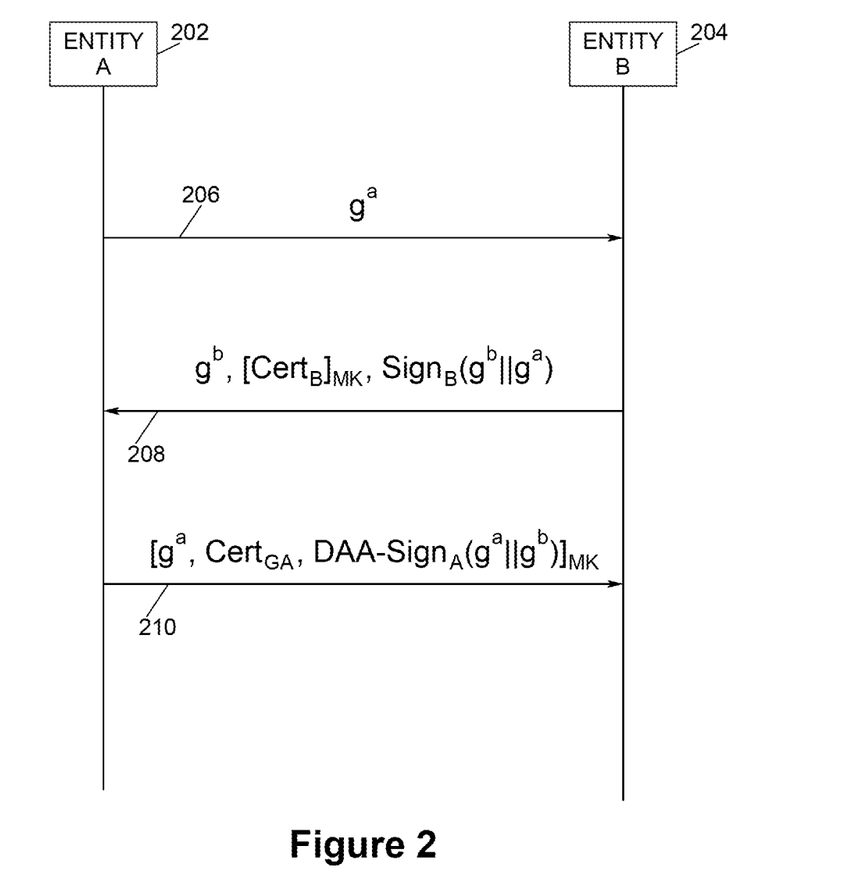
FIG. 2 shows a flow diagram of an embodiment of a process to perform unilateral-anonymous mutual authentication using group based anonymous signatures.

In one embodiment, a unilateral anonymous mutual authentication protocol may be executed between an entity A 202 and an entity B 204. Entity A has a unique DAA private key and an associated DAA group public key certificate. Entity B has its own public-private key pair and certificate. In an embodiment, the protocol may be a Diffie-Hellman (DH) protocol with signatures and a MAC for authentication.

FIG. 2 shows a flow diagram of an embodiment of a process to perform unilateral-anonymous mutual authentication using group based anonymous signatures. The process is performed by processing logic that may comprise hardware (circuitry, dedicated logic, etc.), software (such as one that is run on a general purpose computer system or a dedicated machine), or a combination of both. In one embodiment, the process is performed in conjunction with a system (e.g., the system with respect to FIG. 1). In one embodiment, the process is performed in conjunction with entity A 202 and entity B 204. In one embodiment, the process may be performed by a processing system such as the one shown in FIG. 5 or FIG. 6. In one embodiment, entity A 202 and entity B 204 may be within the same platform, for example, as a processing core and a chipset.

In one embodiment, the process supports unilateral anonymous authentication. Two platforms authenticate to each other, with one of them remaining anonymous and set up a secure channel by using a mutually shared session key generated during process. In one embodiment, entity B 204 is a remote entity or a second hardware platform.

In one embodiment, the process begins by entity A 202 sending message #1 to entity B 204 (process flow 206).

In one embodiment, entity A 202 chooses a random value "a" as its ephemeral DH private key. Entity A 202 generates $g^a$ as its ephemeral DH key-exchange-protocol public key based at least in part on random value "a." Entity A 202 sends $g^a$ to entity B 204.

In one embodiment, entity B 204 sends message #2 to entity A 202 (process flow 208).

In one embodiment, entity B 204 chooses a random value "b" as its ephemeral DH private key. Entity B 204 generates $g^b$ as its ephemeral DH key-exchange-protocol public key based at least in part on random value "b." Entity B 204 generates $g^{ab}=(g^a)^b$ and securely erases b. Entity B 204 generates $SK\|MK=PRF(g^{ab})$, where PRF is a pseudo-random function, SK is the session key and MK is the MAC key. Entity B 204 generates a MAC of $Cert_B$ by using MK, where $Cert_B$ is entity B's public key certificate. Entity B 204 signs $(g^b, g^a)$ in conjunction with its private key and produces $Sign_B(g^b\|g^a)$. Entity B then sends $g^b$, $[Cert_B]_{MK}$, and $Sign_B(g^b\|g^a)$ to entity A 202.

In one embodiment, entity A 202, in response to receiving message #2, verifies message #2.

In one embodiment, entity A 202 generates $g^{ab}=(g^b)^a$ and securely erases "a". Entity A 202 generates $SK\|MK=PRF(g^{ab})$. Entity A 202 verifies entity B's public key group certificate $Cert_B$. Entity A 202 verifies the MAC of $Cert_B$ (e.g., $[Cert_B]_{MK}$) by using the MAC key (i.e., MK). Entity A 202 verifies the signature $Sign_B(g^b\|g^a)$ using entity B's public key (retrievable in $Cert_B$). If any of the above MAC verification, certificate verification, or signature verification fails, entity A aborts the protocol.

In one embodiment, entity A 202 prepares to send message #3 to entity B 204 (process flow 210).

In one embodiment, entity A 202 uses its DAA private key to sign $(g^a, g^b)$ and produces $DAA\text{-}Sign_A(g^a\|g^b)$. Entity A generates a MAC of its DH key-exchange-protocol public key $g^a$, its DAA group certificate $Cert_{GA}$, and $DAA\text{-}Sign_A(g^a\|g^b)$. Entity A 202 then sends $[g^a, Cert_{GA}, DAA\text{-}Sign_A(g^a\|g^b)]_{MK}$, to entity B 204.

In one embodiment, entity B 204, in response to receiving the message #3, verifies message #3.

In one embodiment, entity B 204 verifies the DAA group certificate $Cert_{GA}$. Entity B 204 verifies the DAA signature of $(g^a, g^b)$ using the DAA public key in $Cert_{GA}$. Entity B 204 verifies that $g^a$ in message #3 matches with $g^a$ in message #1. Finally, entity B 204 verifies the MAC of $[g^a, Cert_{GA}, DAA\text{-}Sign_A(g^a\|g^b)]_{MK}$ using MK. If any of the above MAC verification, certificate verification, or signature verification fails, entity B aborts the protocol.

Entities A and B may now use SK as a mutually shared session key for secure future communications.

This protocol is secure against misbinding attacks because the MAC in message #3 binds its signature to the DH public key in message #1, proving that both were created by the same entity. In a misbinding attack, a prover and a verifier do not agree on the participants to the protocol instance. The prover believes the protocol is complete between itself and the verifier. The verifier believes the protocol is complete between itself and an attacker, but not the prover. To avoid this situation, in an embodiment, the protocol must prove that the sender of message #3 is the same as the sender of message #1.

In another embodiment, a mutual anonymous authentication protocol may be executed between entity A 202 and entity B 204. Each entity has a unique DAA private key and an associated DAA group public key certificate.

FIG. 3 shows a flow diagram of an embodiment of a process to perform mutual anonymous authentication using group based anonymous signatures. In this embodiment, creation and verification of message #2 may be modified from the embodiment shown in FIG. 2.

In one embodiment, the process begins by entity A 202 sending message #1 to entity B 204 (process flow 306).

In one embodiment, entity A 202 chooses a random value "a" as its ephemeral DH private key. Entity A 202 generates $g^a$ as its ephemeral DH key-exchange-protocol public key based at least in part on random value "a." Entity A 202 sends $g^a$ to entity B 204.

In one embodiment, entity B 204 sends message #2 to entity A 202 (process flow 308).

In one embodiment, entity B 204 chooses a random value "b" as its ephemeral DH private key. Entity B 204 generates $g^b$ as its ephemeral DH key-exchange-protocol public key based at least in part on random value "b." Entity B 204 generates $g^{ab}=(g^a)^b$ and securely erases b. Entity B 204 computes $SK\|MK=PRF(g^{ab})$, where PRF is a pseudo-random function, SK is the session key and MK is the MAC key. Entity B 204 signs $(g^b, g^a)$ in conjunction with its DAA private key and produces $DAA\text{-}Sign_B(g^b\|g^a)$. Entity B 204 generates a MAC of its DH public key $g^b$, its DAA group certificate $Cert_{GB}$, and $DAA\text{-}Sign_B(g^b\|g^a)$, using MK. Entity B then sends $[g^b, Cert_{GB}, DAA\text{-}Sign_B(g^b\|g^a)]_{MK}$ to entity A 202.

In one embodiment, entity A 202, in response to receiving message #2, verifies message #2.

In one embodiment, entity A 202 generates $g^{ab}=(g^b)^a$ and securely erases "a". Entity A 202 generates SK∥MK=PRF($g^{ab}$). Entity A 202 verifies entity B's public key group certificate $Cert_{GB}$. Entity A 202 verifies the signature DAA-$Sign_B(g^b\|g^a)$ using entity B's DAA public key (retrievable from $Cert_{GB}$). Entity A 202 verifies the MAC of $[g^b, Cert_{GB},$ DAA-$Sign_B(g^b\|g^a)]_{MK}$ by using the MAC key (i.e., MK). If any of the above MAC verification, certificate verification, or signature verification fails, entity A aborts the protocol.

In one embodiment, entity A 202 prepares to send message #3 to entity B 204 (process flow 310).

In one embodiment, entity A 202 uses its DAA private key to sign ($g^a$, $g^b$) and produces DAA-$Sign_A(g^a\|g^b)$. Entity A generates a MAC of its DH public key $g^a$, its DAA group certificate $Cert_{GA}$, and DAA-$Sign_A(g^a\|g^b)$. Entity A 202 then sends $[g^a, Cert_{GA},$ DAA-$Sign_A(g^a\|g^b)]_{MK}$, to entity B 204.

In one embodiment, entity B 204, in response to receiving the message #3, verifies message #3.

In one embodiment, entity B 204 verifies the DAA group certificate $Cert_{GA}$. Entity B 204 verifies the DAA signature of ($g^a$, $g^b$) using the DAA public key in $Cert_{GA}$. Entity B 204 verifies that $g^a$ in message #3 matches with $g^a$ in message #1. Finally, entity B 204 verifies the MAC of $[g^a, Cert_{GA},$ DAA-$Sign_A(g^a\|g^b)]_{MK}$ using MK. If any of the above MAC verification, certificate verification, or signature verification fails, entity B aborts the protocol.

Entities A and B may now use SK as a mutually shared session key for secure future communications. This protocol is also secure against misbinding attacks because the MAC in message #3 binds its signature to the DH public key in message #1, proving that both were created by the same entity.

In another embodiment, a mutual anonymous authentication protocol may be implemented as follows. This mutual anonymous authentication is different than the protocol of FIG. 3 in that the DAA signature does not need to be included in the MAC computation. Instead, a secret key VK may be included in the DAA signature to deter misbinding attacks.

FIG. 4 shows a flow diagram of another embodiment of a process to perform mutual anonymous authentication using group based anonymous signatures. In one embodiment, the process begins by entity A 202 sending message #1 to entity B 204 (process flow 406).

In one embodiment, entity A 202 chooses a random value "a" as its ephemeral DH private key. Entity A 202 generates $g^a$ as its ephemeral DH key-exchange-protocol public key based at least in part on random value "a." Entity A 202 sends $g^a$ to entity B 204.

In one embodiment, entity B 204 sends message #2 to entity A 202 (process flow 408).

In one embodiment, entity B 204 chooses a random value "b" as its ephemeral DH private key. Entity B 204 generates $g^b$ as its ephemeral DH key-exchange-protocol public key based at least in part on random value "b." Entity B 204 generates $g^{ab}=(g^a)^b$ and securely erases b. Entity B 204 generates SK∥MK∥VK=PRF($g^{ab}$), where PRF is a pseudo-random function, SK is the session key, MK is the MAC key, and VK is a secret key used for the binding property. Entity B 204 signs ($g^b$, $g^a$, VK) in conjunction with its DAA private key and produces DAA-$Sign_B(g^b\|g^a\|VK)$. Entity B 204 generates a MAC of its DH public key $g^b$ and its DAA group certificate $Cert_{GB}$ using MK. Entity B then sends $[g^b\|Cert_{GB}]_{MK}$, DAA-$Sign_B(g^b\|g^a\|VK)$ to entity A 202.

In one embodiment, entity A 202, in response to receiving message #2, verifies message #2.

In one embodiment, entity A 202 generates $g^{ab}=(g^b)^a$ and securely erases "a". Entity A 202 generates SK∥MK∥VK=PRF($g^{ab}$). Entity A 202 verifies entity B's DAA public key group certificate $Cert_{GB}$. Entity A 202 verifies the signature DAA-$Sign_B(g^b\|g^a\|VK)$ using entity B's DAA public key (retrievable from $Cert_{GB}$). Entity A 202 verifies the MAC of $[g^b, Cert_{GB}]_{MK}$ by using the MAC key (i.e., MK). If any of the above MAC verification, certificate verification, or signature verification fails, entity A aborts the protocol.

In one embodiment, entity A 202 prepares to send message #3 to entity B 204 (process flow 410).

In one embodiment, entity A 202 uses its DAA private key to sign ($g^a$, $g^b$, VK) and produces DAA-$Sign_A(g^a\|g^b\|VK)$. Entity A generates a MAC of its DH public key $g^a$, its DAA group certificate $Cert_{GA}$ using MK. Entity A 202 then sends $[g^a, Cert_{GA}]_{MK}$, DAA-$Sign_A(g^a\|g^b\|VK)$, to entity B 204.

In one embodiment, entity B 204, in response to receiving the message #3, verifies message #3.

In one embodiment, entity B 204 verifies entity A's DAA group certificate $Cert_{GA}$. Entity B 204 verifies the DAA signature of ($g^a$, $g^b$, VK) using the DAA public key in $Cert_{GA}$. Entity B 204 verifies that $g^a$ in message #3 matches with $g^a$ in message #1. Finally, entity B 204 verifies the MAC of $[g^a, Cert_{GA}]_{MK}$ using MK. If any of the above MAC verification, certificate verification, or signature verification fails, entity B aborts the protocol.

Entities A and B may now use SK as a mutually shared session key for secure future communications. This protocol is also secure against misbinding attacks because the MAC in message #3 binds its signature to the DH public key in message #1, proving that both were created by the same entity.

FIG. 5 illustrates a block diagram of an embodiment of a processing system 500 which may implement a prover platform 110. In various embodiments, one or more of the components of the system 500 may be provided in various electronic devices capable of performing one or more of the operations discussed herein with reference to some embodiments of the invention. For example, one or more of the components of the system 500 may be used to perform the operations discussed with reference to FIGS. 1-4, e.g., by processing instructions, executing subroutines, etc. in accordance with the operations discussed herein. Also, various storage devices discussed herein (e.g., with reference to FIG. 5 and/or FIG. 6) may be used to store data, operation results, etc. In one embodiment, data received over the network 503 (e.g., via network interface devices 530 and/or 630) may be stored in caches (e.g., L1 caches in an embodiment) present in processors 502 (and/or 602 of FIG. 6). These processors may then apply the operations discussed herein in accordance with various embodiments of the invention.

More particularly, the processing system 500 may include one or more processors 502 that communicate via an interconnection network (or bus) 504. Hence, various operations discussed herein may be performed by a processor in some embodiments. Moreover, the processors 502 may include a general purpose processor, a network processor (that processes data communicated over a computer network 503, or other types of a processor (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors. Moreover, the operations discussed with reference to FIGS. 1-4 may be performed by one or more components of the system 500.

In an embodiment, a processor (such as processor 1 502-1) may comprise DAA module 112 as hardwired logic (e.g., circuitry) or microcode. In an embodiment, the DAA module may be implemented in firmware or hardware within chipset 506. In an embodiment, DAA module 112 may be implemented with a TPM (not shown in FIG. 5) in the chipset. In an embodiment, DAA module 112 may be stored in a protected memory (not shown in FIG. 5). In these embodiments, security of DAA processing may be improved over an embodiment where the DAA module is stored in an unprotected memory.

A chipset 506 may also communicate with the interconnection network 504. The chipset 506 may include a graphics and memory control hub (GMCH) 508. The GMCH 508 may include a memory controller 510 that communicates with a memory 512. The memory 512 may store data. The data may include sequences of instructions that are executed by the processor 502 or any other device included in the processing system 500. Furthermore, in an embodiment memory 512 may store one or more of the programs or algorithms discussed herein such as DAA module 112, instructions corresponding to executables, mappings, etc. The same or at least a portion of this data (including instructions and temporary storage arrays) may be stored in disk drive 528 and/or one or more caches within processors 502. In one embodiment of the invention, the memory 512 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple processors and/or multiple system memories.

The GMCH 508 may also include a graphics interface 514 that communicates with a display 516. In one embodiment of the invention, the graphics interface 514 may communicate with the display 516 via an accelerated graphics port (AGP). In an embodiment of the invention, the display 516 may be a flat panel display that communicates with the graphics interface 514 through, for example, a signal converter that translates a digital representation of an image stored in a storage device such as video memory or system memory into display signals that are interpreted and displayed by the display 516. The display signals produced by the interface 514 may pass through various control devices before being interpreted by and subsequently displayed on the display 516.

A hub interface 518 may allow the GMCH 508 and an input/output (I/O) control hub (ICH) 520 to communicate. The ICH 520 may provide an interface to I/O devices that communicate with the processing system 500. The ICH 520 may communicate with an interconnection 522 through a peripheral bridge (or controller) 524, such as a peripheral component interconnect (PCI) bridge, a universal serial bus (USB) controller, or other types of peripheral bridges or controllers. The bridge 524 may provide a data path between the processor 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The interconnection network 522 may communicate with an audio device 526, one or more disk drive(s) 528, and a network interface device 530, which may be in communication with the computer network 503 (such as the Internet, for example). In an embodiment, the device 530 may be a network interface controller (NIC) capable of wired or wireless communication. Other devices may communicate via the bus 522. Also, various components (such as the network interface device 530) may communicate with the GMCH 508 in some embodiments of the invention. In addition, the processor 502, the GMCH 508, and/or the graphics interface 514 may be combined to form a single chip.

Furthermore, the processing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

In an embodiment, components of the system 500 may be arranged in a point-to-point (PtP) configuration such as discussed with reference to FIG. 6. For example, processors, memory, and/or input/output devices may be interconnected by a number of point-to-point interfaces.

Figure 6:
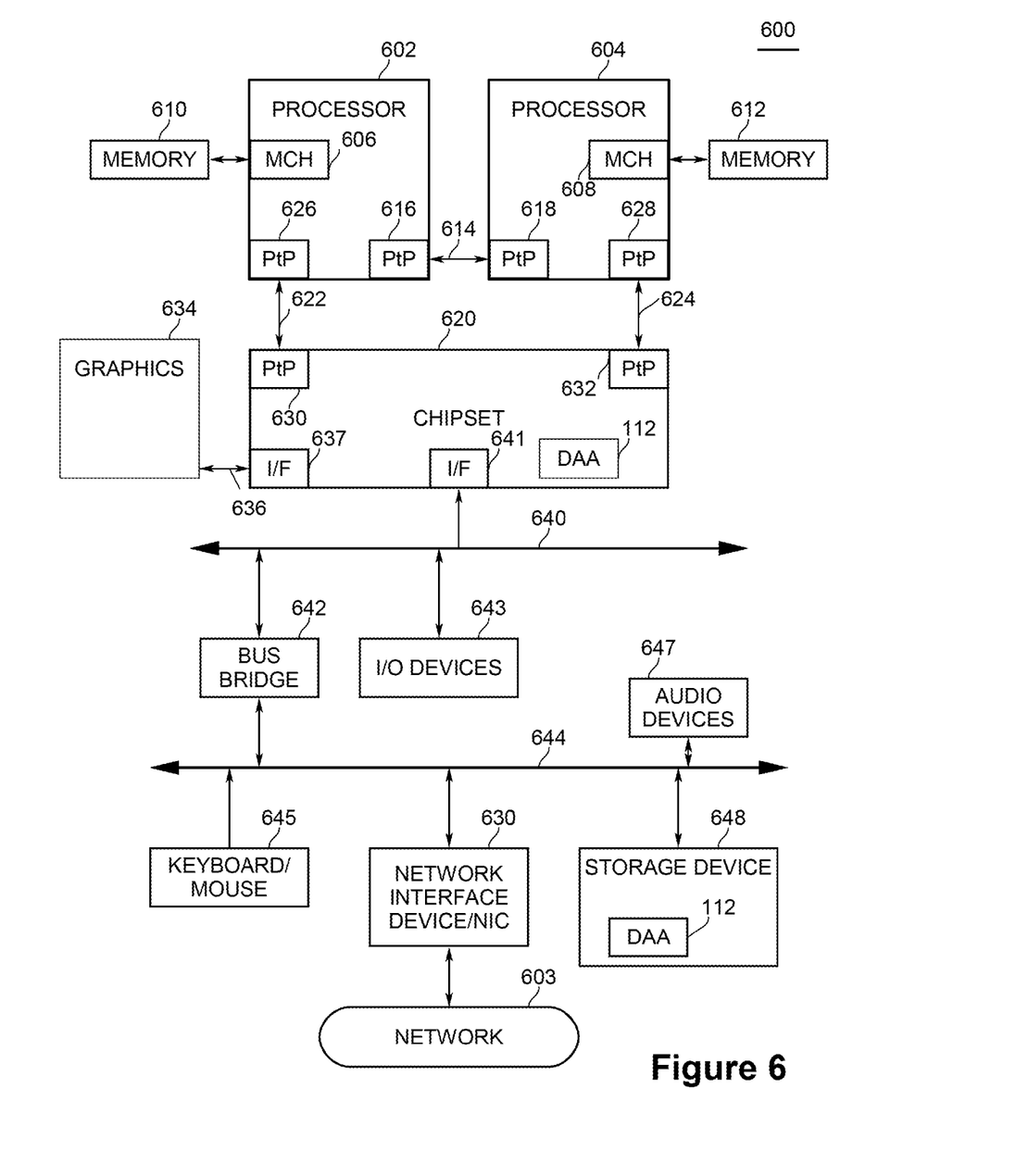
FIG. 6 illustrates a point-to-point processing system for use with one embodiment of the invention.

More specifically, FIG. 6 illustrates a processing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-4 may be performed by one or more components of the system 600.

As illustrated in FIG. 6, the system 600 may include multiple processors, of which only two, processors 602 and 604 are shown for clarity. The processors 602 and 604 may each include a local memory controller hub (MCH) 606 and 608 (which may be the same or similar to the GMCH 508 of FIG. 5 in some embodiments) to couple with memories 610 and 612. The memories 610 and/or 612 may store various data such as those discussed with reference to the memory 512 of FIG. 5.

The processors 602 and 604 may be any suitable processor such as those discussed with reference to processors 502 of FIG. 5. The processors 602 and 604 may exchange data via a point-to-point (PtP) interface 614 using PtP interface circuits 616 and 618, respectively. The processors 602 and 604 may each exchange data with a chipset 620 via individual PtP interfaces 622 and 624 using point to point interface circuits 626, 628, 630, and 632. The chipset 620 may also exchange data with a high-performance graphics circuit 634 via a high-performance graphics interface 636, using a PtP interface circuit 637.

At least one embodiment of the invention may be provided by utilizing the processors 602 and 604. For example, the processors 602 and/or 604 may perform one or more of the operations of FIGS. 1-4. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6. In an embodiment, DAA module 112 may be implemented in hardware or firmware within chipset 620. In an embodiment, DAA module 112 may be implemented with a TPM (not shown in FIG. 6).

The chipset 620 may be coupled to an interconnection network 640 using a PtP interface circuit 641. The interconnection network 640 may have one or more devices coupled to it, such as a bus bridge 642 and I/O devices 643. Via an interconnection 644, the bus bridge 643 may be coupled to other devices such as a keyboard/mouse 645, the network interface device 630 discussed with reference to FIG. 5 (such as modems, network interface cards (NICs), or the like that may be coupled to the computer network 503), audio I/O device 647, and/or a data storage device 648. The data storage device 648 may store, in an embodiment, DAA module 112 code may be executed by the processors 602 and/or 604.

In various embodiments of the invention, the operations discussed herein, e.g., with reference to FIGS. 1-6, may be implemented as hardware (e.g., logic circuitry), software (including, for example, micro-code that controls the operations of a processor such as the processors discussed with reference to FIGS. 5 and 6), firmware, or combinations thereof, which may be provided as a computer program product, e.g., including a tangible machine-readable or computer-readable medium having stored thereon instructions (or software procedures) used to program a computer (e.g., a processor or other logic of a computing device) to perform an operation discussed herein. The machine-readable medium may include a storage device such as those discussed herein.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method of two-way mutual anonymous authentication and key sharing between a first computing platform and a second computing platform comprising:
    selecting a first random value;
    sending a first message, having at least a first key-exchange-protocol public key generated based at least in part on the first random value, from the first computing platform to the second computing platform;
    generating, by the first computing platform in response to receiving a second message from the second computing platform, a shared value based at least in part on the first random value and a second key-exchange-protocol public key associated with the second computing platform;
    generating a mutually shared session key and a message authentication code (MAC) key based at least in part on the shared value;
    verifying a Direct Anonymous Attestation (DAA)-based group certificate associated with the second computing platform;
    verifying a first DAA digital signature from the second message based at least in part on a combination of the key-exchange-protocol public keys retrievable from the first DAA digital signature, wherein the first DAA digital signature is associated with the second computing platform and is retrievable using the second computing platform's DAA public key from the second computing platform's DAA-based group certificate;
    verifying, by using the MAC key, the MAC of the second key-exchange-protocol public key, the second computing platform's DAA-based group certificate, and the first DAA digital signature; and
    using the mutually shared session key for use in secure communication between the first and second computing platforms.

2. The method of claim 1, further comprising:
    generating, by using a DAA-based private key of the first computing platform, a DAA-based signature based at least in part on the combination of the key-exchange-protocol public keys;
    generating, by using the MAC key, a MAC of the first key-exchange-protocol public key, a DAA-based group certificate associated with the first computing platform, and the DAA-based signature; and
    sending a third message from the first computing platform to the second computing platform, the third message comprising the MAC of the first key-exchange-protocol public key, the DAA-based group certificate associated with the first computing platform, and the DAA-based signature.

3. The method of claim 2, further comprising:
    detecting whether there is a failure during certificate verification, MAC verification, or signature verification; and
    aborting the authentication if a failure is detected.

4. The method of claim 3, wherein the first random value is an ephemeral Diffie-Hellman (DH) private key associated with the first computing platform, wherein the first key-exchange-protocol public key is an ephemeral DH public key, and wherein the mutually shared session key and the MAC key are generated using a pseudo-random function based at least in part on the combination of the key-exchange-protocol public keys.

5. The method of claim 3, further comprising securely erasing, by the first computing platform, the first random value after generating the shared value.

6. An apparatus comprising:
    a memory to store cryptographic information from an issuer of a trusted membership group; and
    a direct anonymous attestation (DAA) computing platform to convince a verifier that the DAA computing platform possesses the cryptographic information from the issuer without disclosure of any unique identification information associated with the apparatus, wherein the DAA computing platform is configured to:
    select a first random value;
    send a first message, having at least a first key-exchange-protocol public key generated based at least in part on the first random value, from the apparatus to the verifier;
    generate, by the apparatus in response to receiving a second message from the verifier, a shared value based at least in part on the first random value and a second key-exchange-protocol public key associated with the verifier;
    generate a mutually shared session key and a message authentication code (MAC) key based at least in part on the shared value;
    verify a Direct Anonymous Attestation (DAA)-based group certificate associated with the verifier;
    verify a first DAA digital signature from the second message based at least in part on a combination of the key-exchange-protocol public keys retrievable from the first DAA digital signature, wherein the first DAA digital signature is associated with the verifier and is retrievable using the verifier's DAA public key from the verifier's DAA-based group certificate;

verify, by using the MAC key, the MAC of the second key-exchange-protocol public key, the verifier's DAA-based group certificate, and the first DAA digital signature; and use the mutually shared session key for use in secure communication between the first and second computing platforms.

7. The apparatus of claim 6, wherein the DAA computing platform is further configured to:

generate, by using a DAA-based private key of the apparatus, a DAA-based signature based at least in part on the combination of the key-exchange-protocol public keys;

generate, by using the MAC key, a MAC of the first key-exchange-protocol public key, a DAA-based group certificate associated with the apparatus, and the DAA-based signature; and send a third message from the apparatus to the verifier, the third message comprising the MAC of the first key-exchange-protocol public key, the DAA-based group certificate, and the DAA-based signature.

8. The apparatus of claim 7, wherein the DAA computing platform is further configured to detect whether there is a failure during certificate verification, MAC verification, or signature verification; and abort the authentication if a failure is detected.

9. The apparatus of claim 8, wherein the first random value is an ephemeral Diffie-Hellman (DH) private key associated with the apparatus, wherein the first key-exchange-protocol public key is an ephemeral DH public key, and wherein the DAA computing platform is further configured to generate the mutually shared session key and the MAC key using a pseudo-random function based at least in part on the combination of the key-exchange-protocol public keys.

10. An article of manufacture comprising a computer readable non-transitory storage medium including data storing instructions thereon that, when accessed by a machine, cause the machine to:

select a first random value;

send a first message, having at least a first key-exchange-protocol public key generated based at least in part on the first random value, from a prover platform to a verifier;

generate, by the prover platform in response to receiving a second message from the verifier, a shared value based at least in part on the first random value and a second key-exchange-protocol public key associated with the verifier;

generate a mutually shared session key and a message authentication code (MAC) key based at least in part on the shared value;

verify a Direct Anonymous Attestation (DAA)-based group certificate associated with the verifier;

verify a first DAA digital signature from the second message based at least in part on a combination of the key-exchange-protocol public keys retrievable from the first DAA digital signature, wherein the first DAA digital signature is associated with the verifier and is retrievable using the verifier's DAA public key from the verifier's DAA-based group certificate;

verify, by using the MAC key, the MAC of the second key-exchange-protocol public key, the verifier's DAA-based group certificate, and the first DAA digital signature; and use the mutually shared session key for use in secure communication between the first and second computing platforms.

11. The article of claim 10, further comprising instructions to generate, by using a Direct Anonymous Attestation (DAA)-based private key of the prover platform, a DAA-based signature based at least in part on the combination of the key-exchange-protocol public keys;

generate, by using the MAC key, a MAC of the first key-exchange-protocol public key, a DAA-based group certificate associated with the prover platform, and the DAA-based signature; and sending a third message from the prover platform to the verifier, the third message comprising the MAC of the first key-exchange-protocol public key, the DAA-based group certificate, and the DAA-based signature.

12. The article of claim 11, wherein the first random value is an ephemeral Diffie-Hellman (DH) private key associated with the prover platform, wherein the first key-exchange-protocol public key is an ephemeral DH public key, and wherein the mutually shared session key and the MAC key are generated using a pseudo-random function based at least in part on the combination of the key-exchange-protocol public keys.

13. A method of two-way mutual anonymous authentication and key sharing between a first computing platform and a second computing platform comprising:

selecting a first random value;

sending a first message, having at least a first key-exchange-protocol public key generated based at least in part on the first random value, from the first computing platform to the second computing platform;

generating, by the first computing platform in response to receiving a second message from the second computing platform, a shared value based at least in part on the first random value and a second key-exchange-protocol public key associated with the second computing platform;

generating a mutually shared session key, a message authentication code (MAC) key, and a secret binding key based at least in part on the shared value;

verifying a Direct Anonymous Attestation (DAA)-based group certificate associated with the second computing platform;

verifying a first DAA digital signature from the second message based at least in part on a combination of the key-exchange-protocol public keys and the secret binding key retrievable from the first DAA digital signature, wherein the first DAA digital signature is associated with the second computing platform and is retrievable using the second computing platform's DAA public key from the second computing platform's DAA-based group certificate;

verifying, by using the MAC key, the MAC of the second key-exchange-protocol public key and the second computing platform's DAA-based group certificate; and using the mutually shared session key for use in secure communication between the first and second computing platforms.

14. The method of claim 13, further comprising:

generating, by using a DAA-based private key of the first computing platform, a DAA-based signature based at least in part on the combination of the key-exchange-protocol public keys and the secret binding key;

generating, by using the MAC key, a MAC of the first key-exchange-protocol public key and a DAA-based group certificate associated with the first computing platform; and sending a third message from the first computing platform to the second computing platform, the third message comprising the MAC of the first key-exchange-protocol public key and the DAA-based group certificate associated with the first computing platform, and the DAA-based signature.

15. The method of claim 14, further comprising:

detecting whether there is a failure during certificate verification, MAC verification, or signature verification; and aborting the authentication if a failure is detected.

16. The method of claim 15, wherein the first random value is an ephemeral Diffie-Hellman (DH) private key associated with the first computing platform, wherein the first key-exchange-protocol public key is an ephemeral DH public key, and wherein the mutually shared session key, the MAC key, and the secret binding key are generated using a pseudo-random function based at least in part on the combination of the key-exchange-protocol public keys.

17. An apparatus comprising:

a memory to store cryptographic information from an issuer of a trusted membership group; and a direct anonymous attestation (DAA) computing platform to convince a verifier that the DAA computing platform possesses the cryptographic information from the issuer without disclosure of any unique identification information associated with the apparatus, wherein the DAA computing platform is configured to:

select a first random value;

send a first message, having at least a first key-exchange-protocol public key generated based at least in part on the first random value, from the apparatus to the verifier;

generate, by the apparatus in response to receiving a second message from the verifier, a shared value based at least in part on the first random value and a second key-exchange-protocol public key associated with the verifier;

generate a mutually shared session key and a message authentication code (MAC) key based at least in part on the shared value;

verify a Direct Anonymous Attestation (DAA)-based group certificate associated with the verifier;

verify a first DAA digital signature from the second message based at least in part on a combination of the key-exchange-protocol public keys and the secret binding key retrievable from the first DAA digital signature, wherein the first DAA digital signature is associated with the verifier and is retrievable using the verifier's DAA public key from the verifier's DAA-based group certificate;

verify, by using the MAC key, the MAC of the second key-exchange-protocol public key and the verifier's DAA-based group certificate; and use the mutually shared session key for use in secure communication between the first and second computing platforms.

18. The apparatus of claim 17, wherein the DAA computing platform is further configured to:

generate, by using a DAA-based private key of the apparatus, a DAA-based signature based at least in part on the combination of the key-exchange-protocol public keys and the secret binding key;

generate, by using the MAC key, a MAC of the first key-exchange-protocol public key and a DAA-based group certificate associated with the apparatus; and send a third message from the apparatus to the verifier, the third message comprising the MAC of the first key-exchange-protocol public key and the DAA-based group certificate associated with the apparatus, and the DAA-based signature.

19. The apparatus of claim 18, wherein the DAA computing platform is further configured to detect whether there is a failure during certificate verification, MAC verification, or signature verification; and abort the authentication if a failure is detected.

20. The apparatus of claim 19, wherein the first random value is an ephemeral Diffie-Hellman (DH) private key associated with the apparatus, wherein the first key-exchange-protocol public key is an ephemeral DH public key, and wherein the DAA computing platform is further configured to generate the mutually shared session key and the MAC key using a pseudo-random function based at least in part on the combination of the key-exchange-protocol public keys.

21. An article of manufacture comprising a computer readable non-transitory storage medium including data storing instructions thereon that, when accessed by a machine, cause the machine to:

select a first random value;

send a first message, having at least a first key-exchange-protocol public key generated based at least in part on the first random value, from a prover platform to a verifier;

generate, by the prover platform in response to receiving a second message from the verifier, a shared value based at least in part on the first random value and a second key-exchange-protocol public key associated with the verifier;

generate a mutually shared session key and a message authentication code (MAC) key based at least in part on the shared value;

verify a Direct Anonymous Attestation (DAA)-based group certificate associated with the verifier;

verify a first DAA digital signature from the second message based at least in part on a combination of the key-exchange-protocol public keys and the secret binding key retrievable from the first DAA digital signature, wherein the first DAA digital signature is associated with the verifier and is retrievable using the verifier's DAA public key from the verifier's DAA-based group certificate;

verify, by using the MAC key, the MAC of the second key-exchange-protocol public key and the verifier's DAA-based group certificate; and use the mutually shared session key for use in secure communication between the first and second computing platforms.

22. The article of claim 21, further comprising instructions to generate, by using a DAA-based private key of the prover platform, a DAA-based signature based at least in part on the combination of the key-exchange-protocol public keys and the secret binding key;

generate, by using the MAC key, a MAC of the first key-exchange-protocol public key and a DAA-based group certificate associated with the prover platform; and send a third message from the prover platform to the verifier, the third message comprising the MAC of the first key-exchange-protocol public key and the DAA-based group certificate associated with the prover platform, and the DAA-based signature.

23. The article of claim 22, wherein the first random value is an ephemeral Diffie-Hellman (DH) private key associated with the prover platform, wherein the first key-exchange-protocol public key is an ephemeral DH public key, and wherein the mutually shared session key and the MAC key are generated using a pseudo-random function based at least in part on the combination of the key-exchange-protocol public keys.

* * * * *